H. NEU & L. BLAHA.

PROTECTIVE DEVICE FOR AUTOMOBILES.

APPLICATION FILED OCT. 27, 1917.

Reissued Mar. 26, 1918.

14,451.

2 SHEETS—SHEET 1.

Hugo Neu and Ludwig Blaha, Inventors

By their Attorney

Alfred E. Dunn

H. NEU & L. BLAHA.

PROTECTIVE DEVICE FOR AUTOMOBILES.

APPLICATION FILED OCT. 27, 1917.

Reissued Mar. 26, 1918.

14,451.

2 SHEETS—SHEET 2.

Hugo Neu Inventors
and Ludwig Blaha,
By their Attorney
Clifford L. Dunn

UNITED STATES PATENT OFFICE.

HUGO NEU, OF NEW YORK, N. Y., AND LUDWIG BLAHA, OF LYNDHURST, NEW JERSEY, ASSIGNORS TO NUGO DEVICE CORPORATION, A CORPORATION OF NEW YORK.

PROTECTIVE DEVICE FOR AUTOMOBILES 14,451. Specification of Reissued Letters Patent. Reissued Mar. 26, 1918.

Original No. 1,231,050, dated June 26, 1917, Serial No. 153,656, filed March 9, 1917. Application for reissue filed October 27, 1917. Serial No. 198,897.

*To all whom it may concern:*

Be it known that we, HUGO NEU, a citizen of the United States, residing in the city, county, and State of New York, and LUDWIG BLAHA, a subject of the Emperor of Austria, residing at Lyndhurst, county of Hudson, and State of New Jersey, have invented certain new and useful Improvements in Protective Devices for Automobiles, of which the following is a specification.

This invention relates to a means for disconnecting automobile steering wheels from the steering apparatus and thereby preventing the theft or tampering with the vehicle by unauthorized persons in the absence of the driver.

The primary object of the present invention is to provide a protective device to be attached to the steering apparatus of motor vehicles, whereby, under certain pre-determined conditions, the said steering apparatus may be rendered ineffective for steering purposes, but it will be possible to move the car and guide its movement by the manual manipulation of the front wheels in cases of emergency.

Another object of the invention is the provision of a simple and efficient device for connecting the steering wheel to the steering apparatus which may be permanently attached to the steering mechanism of an automobile and so arranged that by proper manipulation the steering wheel may be made to rotate independently of the rest of the steering apparatus.

Another object is the provision of a means for rendering the steering wheel effective or ineffective relative to the steering apparatus, which may be cheaply produced, due to the fact that it is comprised of few and simple parts.

A still further object is the provision of protective means for an automobile which is easily made operative, neat in appearance and which has its working parts completely inclosed so that they can be manipulated only by a person provided with a key.

Other objects of our invention will manifest themselves upon a reading of the following specification.

While this invention has been set forth in a certain preferred embodiment, it will be understood that modifications may be made without departing from the spirit and scope thereof.

Figure 1:
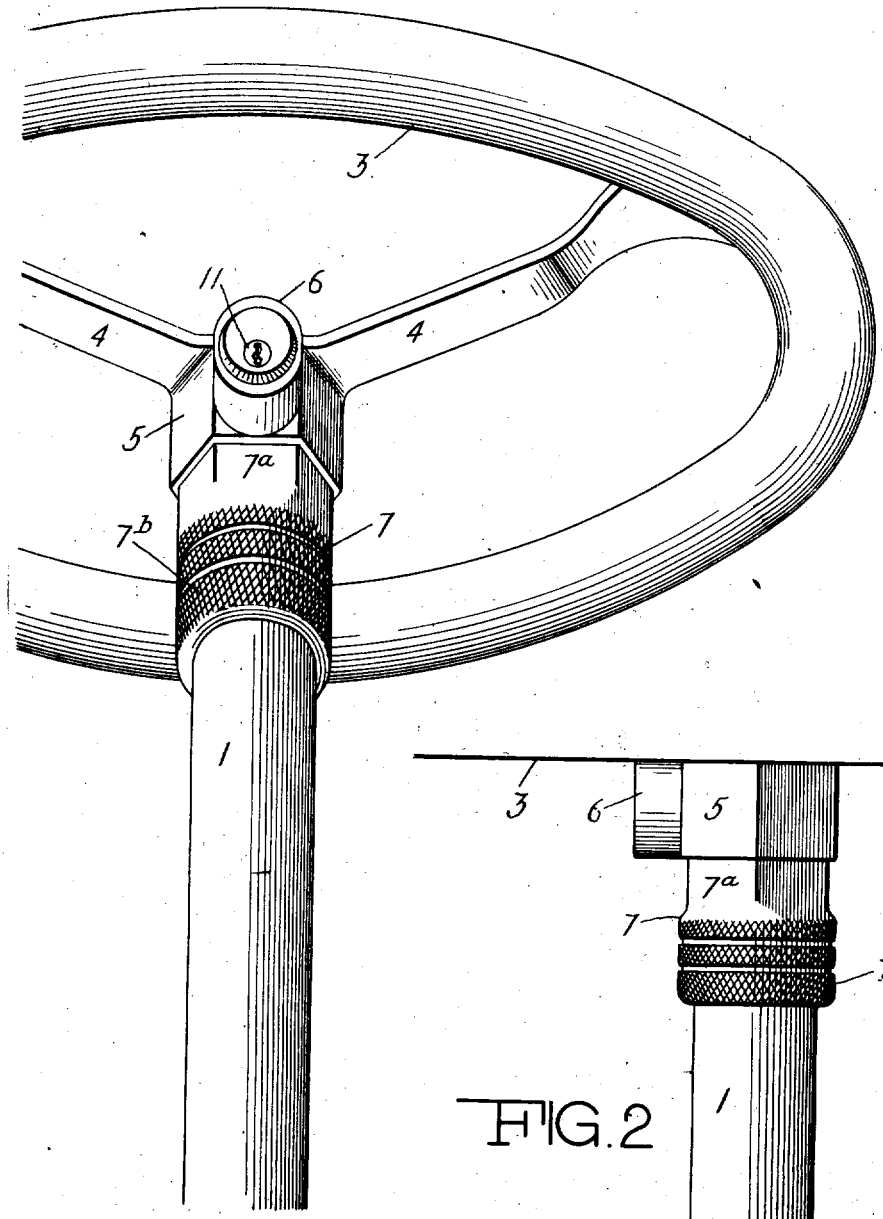
Figure 1 is a perspective of our locking means applied to an automobile steering wheel.
Figure 2:
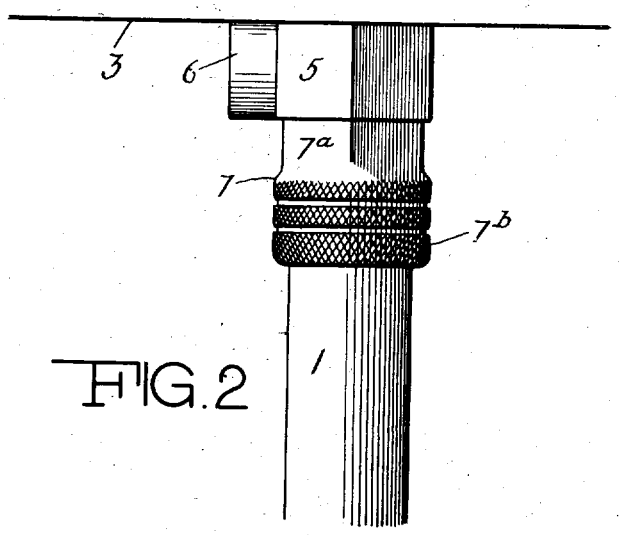
Fig. 2 is a side elevation of the lock.

In the drawings there is shown a steering column 1 wherein is mounted a steering post 2, the latter of which carries at its upper end a steering wheel 3 provided with spokes or arms 4 centering in a hub 5, having a polygonally-shaped recessed portion. Formed integrally with or secured to the hub 5—such as by riveting, welding or the like—is a housing 6, which latter member is adapted to accommodate a locking means, such as a pin lock. A sleeve 7 is provided with an upper and a lower compartment, $7^a$ and $7^b$, respectively, the upper compartment being complementary to the hub 5 and adapted to receive the same, while the lower compartment is circular in shape and adapted to house a polygonal nut 8 secured to the steering post 2. The polygonal nut 8 is of the same configuration as the interior upper part of the sleeve 7 and is positioned just above the end of the steering column which does not extend the full length of the steering post, but only sufficiently far so as to be in close proximity to, or abut against, the lower surface of the nut 8 and have its end inclosed by compartment $7^b$. A bushing 1′ preferably having a diameter corresponding to that of the steering column 1 may be inserted between the upper surface of the nut 8 and the adjacent surface of the hub 5. Secured to the upper edge of the sleeve 7 is a pin 9 which projects through an elongated slot $6^a$ into the housing 6 and is adapted to coöperate with certain elements contained therein.

Figure 3:
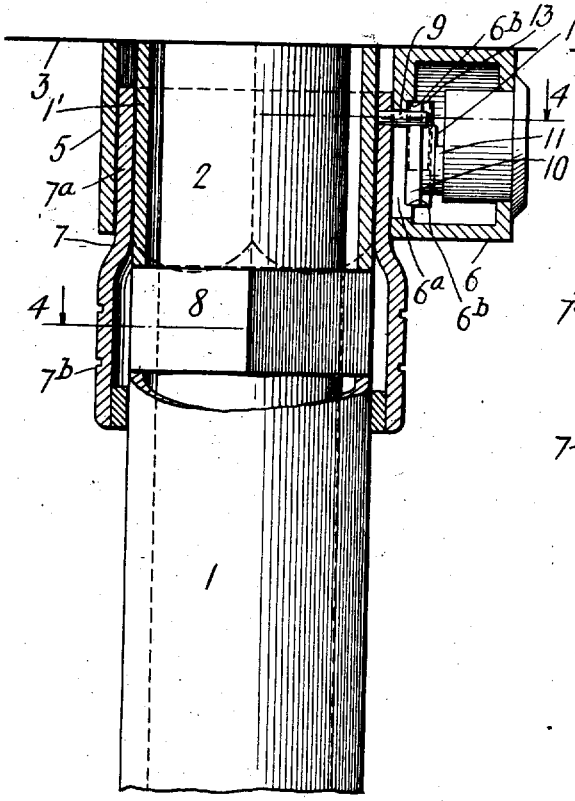
Fig. 3 is a view partly in section showing the position of parts when the steering wheel is free to rotate on the steering column.

An L-shaped member 10 mounted to reciprocate in the bearings $6^b$ formed in the wall of the housing 6 (Fig. 3) is adapted to coöperate with said pin and locks the sleeve 7 in a raised or lowered position depending whichever way the sleeve has been moved. The general features of the locking mechanism may comprise a lock of the ordinary type in which the tumblers thereof are adapted to be raised upon the insertion of the key in the key-hole and includes a barrel 11 carrying at its extremity a cam member 12. On the rotation of the barrel the cam member 12 is adapted to engage and move the L-shaped member 10 against the tension of spring 13 in a horizontal plane so that the portion thereof in engagement with the pin 9 clears the latter, thus permitting the sleeve 7 to be moved in a vertical direction. Assuming that it is desired to free the steering wheel or disable the steering apparatus, by inserting a key in the key-hole and turning the same, the cam 12 will move the L-shaped member 10 in a horizontal direction (toward the left in Fig. 5) so that the lower end clears the pin 9 and by pushing upwardly on the sleeve 7 it may be moved upwardly until the polygonal portion of the sleeve 7 disengages the nut on the steering post. When the sleeve 7 has been raised as just explained the cam 12 is actuated by means of the key so that the member 10 moves toward the right in Fig. 5 under the impulse of the spring 13, the pin 9 being engaged by the upper surface of said member and the sleeve held against movement in a downward direction. (See Fig. 3). In this disposition of the parts, the steering wheel 3 may be rotated independently of the rest of the steering apparatus so that it is impossible to steer or guide the car from the driver's seat. However, it will be noted that no other part of the steering apparatus is disabled, and by manipulating the front wheels by hand, the car may be pushed aside in case of emergency, or when it is desired to move it a short distance.

Figure 5:
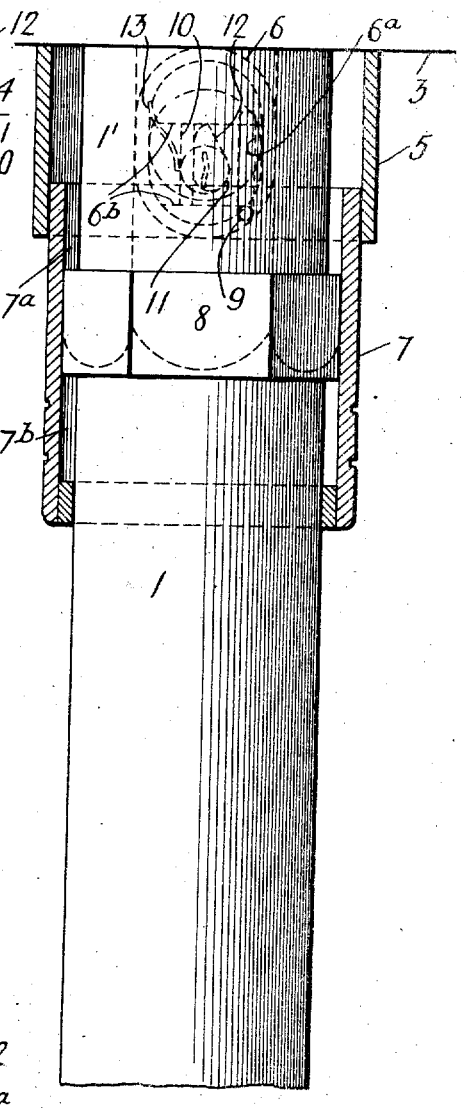
Fig. 5 is a view partly in section taken on line 5—5 of Fig. 4, showing the position of the parts when the steering wheel is locked to the steering column.
Figure 4:
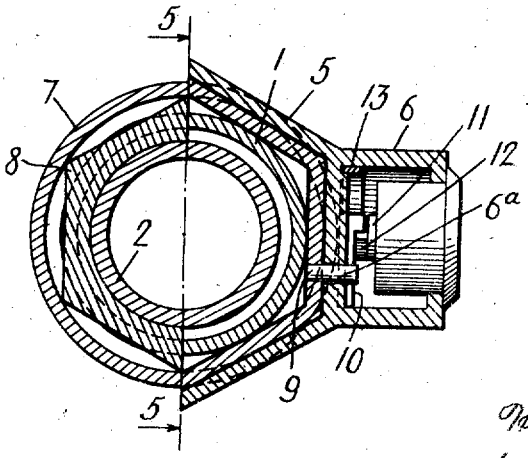
Fig. 4 is a section taken on line 4—4 of Fig. 3.

When it is desired to connect the steering wheel to the steering apparatus, the member 10 may be reciprocated by the actuation of the cam 13 as previously described, and the sleeve 7 drawn down to the position shown in Fig. 5, the movement of the member 10 under the action of the spring 13 causing the underside thereof to engage the pin 9 and prevent the upward movement of the sleeve 7. In this position the polygonal portion of the sleeve 7 registers with the corresponding sides of the nut 8, thus securely fastening these two members together and locking the steering wheel to the steering post.

It will be noted that the lower edge of the sleeve 7 is spun over inwardly so as to bring it into engagement with the outer surface of the steering column 1, thereby preventing the entrance or insertion of foreign objects, such as dust or instruments intended to render ineffective the locking means. To afford an easy grip for the manipulation of the collar 7 its lower half is knurled, as shown.

From the above it is obvious that to use the protective means herein described, all that is required on the part of the driver is to insert a key into the lock and move the sleeve 7 upwardly. This will effect the release of the steering wheel and render the steering apparatus ineffective. When desired to use the steering wheel for driving the car, all that is again required is to insert the key and move the sleeve downwardly into engagement with the hub on the steering wheel.

While we have herein shown and particularly described the preferred embodiment of our invention we do not want to be limited to the precise details of construction illustrated, as changes may be readily made without departing from the spirit and scope of our invention.

Having thus described our invention, what we claim as new herein and desire to secure by Letters Patent of the United States is:—

1. In a locking means for steering wheels, an extension secured to the hub of a steering wheel and having a polygonally-shaped recess, a fixed member carried by the steering post and having an exterior complemental surface, and a sleeve slidably mounted and adapted to engage the fixed means on the steering post and fit into said recess, whereby said steering wheel is locked against independent rotation.

2. In a locking means for steering wheels, an extension secured to the hub of the steering wheel and having a polygonally-shaped recess, a nut secured to the steering post and having an exterior complemental surface, and a sleeve slidably mounted and adapted to have its exterior surface fit into said recess and its interior surface engaging the periphery of the nut secured to the steering post, whereby said steering wheel is locked against independent rotation.

3. The combination with a steering post and a steering wheel, of a locking device including an extension having a compartment carried by the hub of the steering wheel, said compartment being adapted to accommodate a sleeve arranged to be slidably mounted on the steering post for movement to and from the steering wheel and adapted to be held against rotation on said steering post, the upper exterior surface of said sleeve being polygonally-shaped and adapted to register with a complemental recess formed in said compartment, and locking means effective when said sleeve is moved away from the steering wheel, whereby said steering wheel is locked to the steering post.

4. In a locking means for steering wheels, an extension secured to the hub and having a polygonally-shaped recess, a polygonally-shaped nut carried by the steering post and a slidable member adapted to coöperate with said extension and said nut, said slidable member having a portion of its exterior surface complementally shaped and adapted to enter said recess and the interior surface of said portion being adapted to fit over said nut, the engaging surface of said portion depending upon the position of said slidable member.

5. In a protective device for automobiles, the combination with a steering post and a steering wheel, of means for rendering said steering wheel effective and ineffective to operate said post, said means comprising a polygonally shaped member non-rotatably secured to said post, a complementary engaging member non-rotatably connected to said steering wheel and adapted to engage substantially the entire periphery of said polygonally shaped member to render the wheel effective for steering purposes and to be disengaged therefrom to render the said wheel ineffective.

6. In a protective device for automobiles, the combination with a steering post and a steering wheel, of means for rendering said steering wheel effective and ineffective to operate said post, said means comprising a polygonally shaped member non-rotatably secured to said post, a complementary engaging member non-rotatably connected to said steering wheel movable longitudinally of the axis of the steering post and adapted to engage substantially the entire periphery of said polygonally shaped member to render the wheel effective for steering purposes and to be disengaged therefrom to render the said wheel ineffective.

7. In a protective device for automobiles, the combination with a steering post and a steering wheel, means for rendering said steering wheel effective and ineffective to operate said post, said means comprising a hexagonally shaped member non-rotatably secured to said post, complementary engaging surfaces rotatable with said wheel and movable longitudinally of the axis of the steering post and adapted to engage the periphery of said hexagonally shaped member to render the wheel effective for steering purposes and to be disengaged therefrom to render said wheel ineffective.

8. In a protective device for automobiles, the combination with a steering post, a steering wheel, of means for rendering said steering wheel effective and ineffective to operate said post, said means including a member non-rotatably secured to said post, the radii from the axis of said post to the periphery of said member varying at different points, a complementary engaging member non-rotatably connected to the said steering wheel and adapted to be moved longitudinally into and out of engagement with the member on said steering post, and means adapted to lock said engaging members in and out of engagement.

9. In a protective device for automobiles, the combination with a steering post and a steering wheel, of means for rendering said steering wheel effective and ineffective to operate said post, said means comprising a polygonally shaped member rigidly secured to said post, a complementary engaging member non-rotatably connected to said steering wheel, movable longitudinally of the axis of the steering post and adapted to engage substantially the entire periphery of said polygonally shaped member to render the wheel effective for steering purposes, and to be disengaged therefrom to render said wheel ineffective, and means for locking the engaging members into and out of engagement.

10. In a protective device for automobiles, the combination with a steering post and a steering wheel, of means for rendering said steering wheel effective and ineffective to operate said post, said means comprising a hexagonally shaped member rigidly secured to said post, a complementary engaging member rotatable with said wheel and movable longitudinally of the axis of the steering post adapted to engage and be disengaged from the periphery of said hexagonally shaped member, and means for locking said engaging members into and out of engagement.

HUGO NEU.
LUDWIG BLAHA.